(12) United States Patent
Sanneck et al.

(10) Patent No.: US 11,304,070 B2
(45) Date of Patent: Apr. 12, 2022

(54) METHOD OF ADAPTING OPERATION OF SELF-ORGANIZING NETWORK FUNCTIONS

(71) Applicant: NOKIA SOLUTIONS AND NETWORKS OY, Espoo (FI)

(72) Inventors: Henning Sanneck, Munich (DE); Haitao Tang, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 909 days.

(21) Appl. No.: 14/767,623

(22) PCT Filed: Feb. 14, 2013

(86) PCT No.: PCT/EP2013/052930
§ 371 (c)(1),
(2) Date: Aug. 13, 2015

(87) PCT Pub. No.: WO2014/124671
PCT Pub. Date: Aug. 21, 2014

(65) Prior Publication Data
US 2015/0382209 A1    Dec. 31, 2015

(51) Int. Cl.
*H04W 24/02*    (2009.01)
*H04W 24/10*    (2009.01)
*H04W 84/18*    (2009.01)

(52) U.S. Cl.
CPC .......... *H04W 24/02* (2013.01); *H04W 24/10* (2013.01); *H04W 84/18* (2013.01)

(58) Field of Classification Search
CPC ...... H04W 24/02; H04W 24/10; H04W 84/18
See application file for complete search history.

(56) References Cited

U.S. PATENT DOCUMENTS

| | | | | |
|---|---|---|---|---|
| 2012/0307697 A1* | 12/2012 | Mukhopadhyay | .... | H04W 24/02 370/311 |
| 2013/0124483 A1* | 5/2013 | Furuhashi | ............. | G06F 16/258 707/661 |
| 2014/0040450 A1* | 2/2014 | Sanneck | ................. | H04L 41/04 709/223 |
| 2014/0123142 A1* | 5/2014 | Huh | ..................... | G06F 9/45533 718/1 |
| 2014/0293831 A1* | 10/2014 | Han | ..................... | H04W 24/02 370/254 |
| 2014/0337490 A1* | 11/2014 | Zhao | .................... | H04L 41/046 709/220 |

(Continued)

OTHER PUBLICATIONS

Klaus Nolte, et al.; "The E3 architecture: Enabling future cellular networks with cognitive and self-x capabilities" XP055083879; Jan. 1, 2011 (Jan. 1, 2011); 26 pages.

(Continued)

*Primary Examiner* — Harry H Kim
(74) *Attorney, Agent, or Firm* — Squire Patton Boggs (US) LLP

(57) ABSTRACT

A method of adapting operation of self-organizing network functions in a communication network comprising a big data level system and a self-organizing network system and at least one network element is provided, wherein the method comprises adapting the operation of at least one self-organizing network function by using knowledge achieved by analysis performed on the big data level.

18 Claims, 3 Drawing Sheets

(56) References Cited

U.S. PATENT DOCUMENTS

| | | | | |
|---|---|---|---|---|
| 2015/0026327 A1* | 1/2015 | Tang | ............... | H04W 84/18 709/223 |
| 2015/0045008 A1* | 2/2015 | Karla | ............... | H04W 24/02 455/418 |
| 2015/0071118 A1* | 3/2015 | Sanneck | ............ | H04L 41/0873 370/255 |
| 2015/0222488 A1* | 8/2015 | Schmetz | ............ | H04L 41/5054 370/241.1 |

OTHER PUBLICATIONS

Kostas Tsagkaris, et al.; "Autonomies in Wireless Network Management: Advances in Standards and Further Challenges"; IEEE Network; Nov./Dec. 2011; pp. 41-49.

3GPP TS 36.300 V8.12.0 (Mar. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

3GPP TS 36.902 V1.0.1 (Sep. 2008); 3rd Generation Partnership Project; Technical Specification Group Radio Access Network; Evolved Universal Terrestrial Radio Access Network (E-UTRAN); Self-configuring and self-optimizing network use cases and Solutions (Release 8).

Big data—The web page at: https://web.archive.org/web/20130115165719/http://en.wikipedia.org/wiki/Big_data.

Seppo Hamalainen, et al.; "LTE Self-Organising Networks (SON)"—Network Management Automation for Operational Efficiency, Wiley, 2012.

NGMN (next generation mobile networks); An Annex Deliverable by the NGMN Alliance; "NGMN Informative List of SON Use Cases"; Apr. 17, 2007.

NGMN (next generation mobile networks); An Annex Deliverable by the NGMN Alliance; "NGMN Use Cases related to Self Organising Network, Overall Description"; May 31, 2007.

WO International Search Report application No. PCT/EP2013/052930 dated Oct. 24, 2013.

* cited by examiner

METHOD OF ADAPTING OPERATION OF SELF-ORGANIZING NETWORK FUNCTIONS

FIELD OF INVENTION

The present invention relates to the field of methods of adapting operation of self-organizing network functions, in particular in a (mobile) communication network. Furthermore, the invention relates to a big data system, a self-organizing network system and a communication system. Moreover, the invention relates to a program element, and a computer-readable medium.

BACKGROUND

A communication network, such as a cellular network, typically comprises a plurality of network elements, e.g. base stations, communicating with each other and with user equipment, e.g. mobile phones, PDAs or laptops, or the like.

In order to improve the network efficiency for different network conditions, for example, the network may be formed as a self-organizing network (SON). In particular, SONs are seen as a key enabler for automated network management in next generation mobile communication networks such as LTE or LTE-A, as well as multi-radio technology networks known as heterogeneous networks (HetNet). SON areas include self-configuration, which deals with the auto-connectivity and initial configuration of new network elements (such as base stations), and self-optimization, which targets the optimal operation of the network, triggering automatic actions in case the demand for services, user mobility or usual application usability significantly changes that require adjusting network parameters as well as use cases such as energy saving or mobility robustness optimization. These functionalities are complemented by self-healing, which aims at automatic anomaly detection and fault diagnosis. Related areas are Traffic Steering (TS) and Energy Savings Management (ESM).

SON has been codified by the 3GPP Release 8 specifications in a series of standards including 36.902, as well as public white papers outlining use cases from the NGMN. For example SON features or functions may be used in UMTS Long Term Evolution (LTE). The LTE specification inherently supports SON features or functions like Automatic Neighbor Relation (ANR) detection, which a feature of 3GPP LTE Rel. 8.

SON aims at replacing conventional "offline" network operation and optimization processes (and associated tools). SON functions, realize individual use cases (in the areas introduced above), in an "online", distributed fashion. Instances of a certain SON function type operate within their specific narrow scope on near real-time, relatively small streams of data. SON functions have a monitoring part where certain conditions which should be detected in the data stream are described. If such a condition is detected, an algorithm part is triggered which comes up with configuration change proposals. Those proposals are then transferred by the action part to the respective configuration deployment entity. SON function instances offer rather fast reaction to detected conditions. To avoid inconsistencies between the different function instances, SON coordination is implemented which binds the different functions together, usually by defining policies if "concurrent" operation is allowed or should be prevented.

In the recent past, much work has been devoted to designing individual SON functions, less to integrating (multi-vendor) SON functions into a system using SON coordination. Even less work has been done on the question of how a SON system is integrated with conventional network operation and optimization mechanisms.

On the other hand so called big data systems may be used when managing a communication network. "Big data" systems applied to network operation and optimization can be seen as another evolution track from conventional network operation and optimization tools. "Big data" refers to systems working with very large data sets, where the actual processing has to be distributed (due to the extreme amount of data as well as the associated processing requirements). Building blocks are MapReduce-type operations and distributed file systems. "Big data" systems offer a very detailed view on network performance based on very large amounts of data. Despite their distributed realization they follow a centralized concept, i.e., the results from the "big data" analytics should be available at a centralized location, usually for reporting purposes. Due to the time required for aggregating and processing the data as well as the usual use cases (long-term reporting, long-term trend analysis and/or prediction and long-term network planning and/or re-configuration), the big data system can be characterized as being rather "offline".

In information technology the term "big data" may particularly denote a collection of data sets so large and complex that it becomes difficult to process using on-hand database management tools or traditional data processing applications. For example a mobile network comprising more than thousand or more than tens of thousands of base stations may generate data in the range of Terabytes of data per day (Performance Management data, Fault Management data, trace data), which may be understood by generating big data (e.g. http://en.wikipedia.org/wiki/Big_data). The challenges may include capture, curation, storage, search, sharing, analysis, and visualization. The trend to larger data sets is due to the additional information derivable from analysis of a single large set of related data, as compared to separate smaller sets with the same total amount of data, allowing correlations to be found. "Big data" usually includes data sets with sizes beyond the ability of commonly-used software tools to capture, curate, manage, and process the data within a tolerable elapsed time.

The partition of the SON paradigm into individual functions with a narrow scope may be regarded as a big advantage as specific problems in network operation and optimization are addressed by a function serving as a building block. So this function can be combined then with other functions from another source by means of SON coordination, thereby avoiding the creation of e.g., one single "self-optimization" function which is difficult to maintain over time, can only be customized in a difficult way, etc. However, the mentioned partitioning limits the capabilities of the SON functions inherently, i.e., certain overarching (per-function- and system level) knowledge cannot be acquired. Therefore, over time, the operation of the SON-enabled system will require adaptations to be done by humans.

SUMMARY OF THE INVENTION

Thus, there may be a need for a method of adapting operation of self-organizing network functions, a big data system, and a self-organizing network system which may at least overcome some of the above mentioned disadvantages, in particular, which may enable an increased performance of a communication network.

This need may be met by a method of adapting operation of self-organizing network functions, a big data system, a self-organizing network system, a communication network a program element, and a computer-readable medium according to the independent claims. Advantageous embodiments of the present invention are described by the dependent claims.

According to an exemplary aspect a method of adapting operation of self-organizing network functions in a communication network comprising a big data level system and a self-organizing network system and at least one network element is provided, wherein the method comprises adapting the operation of at least one self-organizing network function by using knowledge achieved by analysis performed on the big data system or at the big data system level.

In particular, the method according to an exemplary aspect may enable using analytics on "big data" (e.g. data mining) generated from a mobile communication network to adapt and/or tune the operation of self-organizing network (SON) functions, in particular using input during operational phase, thereby efficiently combining the characteristics of "big data" and SON.

According to an exemplary aspect a big data system for a communication network wherein the communication system comprises a self-organizing network system is provided, wherein the big data system comprises an analytics module or level, wherein the analytics module is adapted to perform an analysis on data collected by network elements and to provide results of the analysis to a self-organizing network function.

In particular, the self-organizing network function may be present or implemented in the self-organizing network system, e.g. an operation, administration and maintenance system or a network element. However, the self-organizing function may also be implemented in the big data system itself. In particular, the analytics module or level may comprise a processing unit or may be formed by a processing unit which is adapted to perform the analysis. Such an adaptation may be provided by a specific code or software stored in the module or running at the module. However, the analytics module may also be formed by some kind of hardwired electronic components or in a hybrid form of software and hardwired components. Thus, the analytics module or level may provide or may define capabilities of the big data system. These capabilities originating from the big data system or of the big data system may then be used on the SON function level. Thus, it may be possible to improve the functionality or capability of the SON functions or SON system.

According to an exemplary aspect a self-organizing network system for a communication network, the self-organizing network system comprising self-organizing functions, wherein the self-organizing network system is adapted to receive analysis results of an analytics module or level of a big data system.

In particular, the self-organizing network system or self-organizing network level system may be an operation, administration and maintenance system or a network element.

According to an exemplary aspect a communication system is provided wherein the communication system comprises a big data system according to an exemplary aspect and a self-organizing network system according to an exemplary aspect.

According to an exemplary aspect a program element is provided, which, when being executed by a processor, is adapted to control or carry out a method according to an exemplary aspect.

According to an exemplary aspect a computer-readable medium is provided, in which a computer program is stored which, when being executed by a processor, is adapted to control or carry out a method according to an exemplary aspect.

By using the method according to an exemplary aspect it may be possible to enable an efficient and easy operating or managing of a heterogeneous communication network.

In particular, the exemplary aspect consists of knowledge creation at the "big data" level and the usage of such knowledge within SON functions. This may allow to improve, in particular for a specific SON function, the training capability, identifying long-term trends as well as monitoring and verification of performance. In particular, an analysis in the big data system may be based on algorithms similar to the one contained in the SON functions in the OAM system or NE but running on an analytics level or module of the big data system. Thus, a more powerful analysis may be possible with respect to the computing power as well as with respect to the available data set. Furthermore, it may be possible to perform the analysis in the big data system retrospective to correlate actual configuration changes.

Summarizing a gist of an exemplary aspect may be based on combining analysis on big data level and SON functions. In particular, knowledge generated or deduced at the big data level may be used in SON functions or in operating or executing SON functions. Thus, the capability, functionality or performance characteristics of the big data system may be used inside of the SON system. While there are may be some differences, as outlined above, "big data" and SON systems may share a common "analytics" framework in that data is acquired for monitoring, algorithms are run on machines using the data to provide insights or knowledge to humans or on machine level, and finally actions are based on that insights. Since the insights or knowledge is provided to humans or remains on machine level, some kind of open-loop operation, i.e. an operation where still human interaction is possible or necessary, and/or closed-loop operation, i.e. an operation where no human interaction is possible or necessary, may be enabled. Thus, the combining may enable that the advantages of the big data systems and the SON functions may be combined as well.

Due to the possible combination of the advantages of SON functions and big data possible future changes of SON functions may still be manageable. For example, SON may become more "data-intensive" in the future, e.g., by reducing the typical "granularity period" intervals (currently such intervals are longer than 15 minutes) over which counters are averaged in the network elements, e.g. to enable quicker reaction times.

introducing new sources of data, like MDT (Minimization of Drive Tests), which allows to acquire data from UEs which are potentially location-annotated, e.g. that there is not only per-cell aggregated data available but performance data can be computed for much smaller areas.

in addition to the deployment of multiple Radio Access Technologies (RATs) in a specific geographical area, some of those RATs are split into several cell layers (macro, micro, pico, femto). Each of these layers will generate data and through the geographic relationship, the generated data exhibits certain relationships which are advantageously to be taken into account.

Next, further exemplary embodiments of the method of adapting operation of self-organizing network functions in a communication network are described. However, these embodiments also apply to the big data system, the self-organizing network system, the communication system, the program element, and the computer-readable medium.

According to an exemplary embodiment of the method the adaptation of the operation is performed by adapting and/or creating at least one profile of a set of profiles. In particular, an adaptive profile creation and/or updating may be performed.

In the context of this application the term "set of profiles" or "set of characteristics" may particularly denote a set of data sets describing the behaviour, e.g. normal behaviour or abnormal behaviour including their related action-result associations, of a given SON function.

According to an exemplary embodiment of the method the creation and/or updating is based on information of certain identified data entities and/or their relations.

For example, the identified data entities may be network elements. In particular, said information may be used to generate or update a set of "profiles" or "characteristics" describing the behaviour of said network elements.

In case a profile needs to be created, since no corresponding profile exists in advance for example, the information of the identified data entities and/or their relations may be used to construct an initial or new profile. In case such an initial profile already exists, the information of the identified data entities and/or their relation may be used to update the already existing profile. In particular, this process or method may be based on the assumption that the basic characterization of a set of SON functions is known. In this context the term "characterization" may refer to a syntactic and semantic description of the SON functions interfaces, e.g. input/output parameters and their semantic target setting interface parameters and their semantic, as well as knowledge about the internal operation of the SON function.

In particular, the method may be performed in the big data level system, e.g. may be formed or realized by a module, for example within the big data analytics entity, level or framework.

According to an exemplary embodiment of the method the at least one adapted profile is used by a corresponding SON function.

In particular, the at least one adapted profile may be used to modify, e.g. improve, the SON function. For example, the modification may be performed during the operation phase, e.g. of the network element and/or OAM system.

In particular, the method of this exemplary embodiment may be realized by a module within an/or each respective SON function which interprets profile information, e.g. information of certain identified data entities and/or their relations.

Thus, it may be possible that the behaviour of the SON function may be adjusted according to received information.

According to an exemplary embodiment the method further comprises at least one step out of the group consisting of the following steps: training at least one self-organizing network function based on the adapting of the operation of at least one self-organizing network function; identifying long-term trends; monitoring of self-organizing network functions; verifying of self-organizing network functions; and learning for self-organizing network functions.

In particular, one or all steps may be based on the adapting of the operation of at least one self-organizing network function. In particular, the trained SON function may be the same as the SON function the operation of which is adapted. However, it is also possible that the trained SON function and the SON function the operation of which is adapted are different SON functions. Thus, it is possible that another at least one SON function is trained and/or that said at least one SON function is trained.

In particular, the term "long-term trend" may relate to a shifting or changing of a characteristic of the communication network and/or a network element and/or users of a network element or user equipment, which may result in a shifting or changing of the performance of the communication network and/or operation parameter of the communication network. For examples, such trends may be the user behaviour, traffic intensity in the communication network or the like. In this context the time scale may depend on the application and may in particular in a time scale of about minutes, hours or even days.

In particular, the monitoring and/or verifying and/or learning may be based on algorithms similar to the one contained in the SON functions in the OAM system or NE but running on an analytics level or module of the big data system.

According to an exemplary embodiment the method further comprises performing the analysis at an analytics module of the big data system.

According to an exemplary embodiment the method further comprises transferring the result of the analysis to the self-organizing network system and/or the network element.

According to an exemplary embodiment of the self-organizing network system the self-organizing network system is further adapted to adapt an operation of at least one of the self-organizing network functions based on the received analysis results.

In particular, the adapting may be performed by a processing unit of the self-organizing network system.

Summarizing an exemplary aspect may relate to a method of using analytics on "big data" (data mining) generated from a mobile network to adapt and tune the operation of SON functions (input during operational phase), thereby efficiently combining the characteristics of "big data" and SON. Thus, a gist of the exemplary aspect may consist of knowledge creation at the "big data" level and the usage of such knowledge within SON functions. This may allow to improve (for a specific SON function) the training capability, identifying long-term trends as well as monitoring and verification of performance.

At least some of the described embodiments may have some of the following advantages:

Exploitation of the significantly higher computing capabilities of the "big data" system for SON: i.e., that e.g., a SON verification process, which may take rather long at the OAM/SON system level, may be executed much faster at the "big data" system level and only the result is fed back to the OAM/SON system level. In particular, SON verification may particularly denote a process for checking and/or verifying the operation of SON function instances. This verification process may be performed after changes which were requested to the SON function or SON function instances have been executed on the network, such that the aggregate or overall behaviour of the SON function instances can be assessed. The assessment or checking may result in a decision to rollback or cancel one or more of the requested and executed changes. Thus, the SON verification process may perform a checking whether triggered changes or modifications to the SON function or SON function instances lead to an intended or desired changes in the operation or output of the SON function.

Exploitation of the significantly larger data set available in the "big data" system for SON: i.e., that e.g. a certain SON function instance can be trained not only with the data of its proper network domain or cell, but potentially with data from another network domain or deployment with similar characteristics. Furthermore, specific patterns in the data may be only found through analysis of very large data sets. Specifically, large data sets for a limited time interval but across a wider network domain may yield different conclusions based on data mining rather than a similarly large data set for a much longer time interval across a much smaller network domain.

Exploitation of the increased level of human supervision by the increased level of aggregation: some form of human-in-the-loop (like supervised machine learning) is better feasible at the higher architectural level of the "big data" system, rather at each individual OAM system. That means, that human knowledge added to the system can then be more universally applied e.g., for an entire nation-wide network (rather than just some network domain).

Time scales of the "big data" analytics process (several hours, days, weeks) match well with the retraining/operational intervals of SON functions (retraining: hours, days, weeks; operation: seconds-minutes, hours, days).

In particular, an exemplary aspect may be seen in an evolution (combination) of different aspects of the managing of a communication network. In particular, exemplary aspects may enable an evolution of the so called customer experience management (CEM) as well as of operation support systems OSS and/or business support systems BSS.

The aspects and exemplary embodiments defined above and further aspects of the invention are apparent from the example of embodiment to be described hereinafter and are explained with reference to these examples of embodiment.

DETAILED DESCRIPTION

Figure 1:
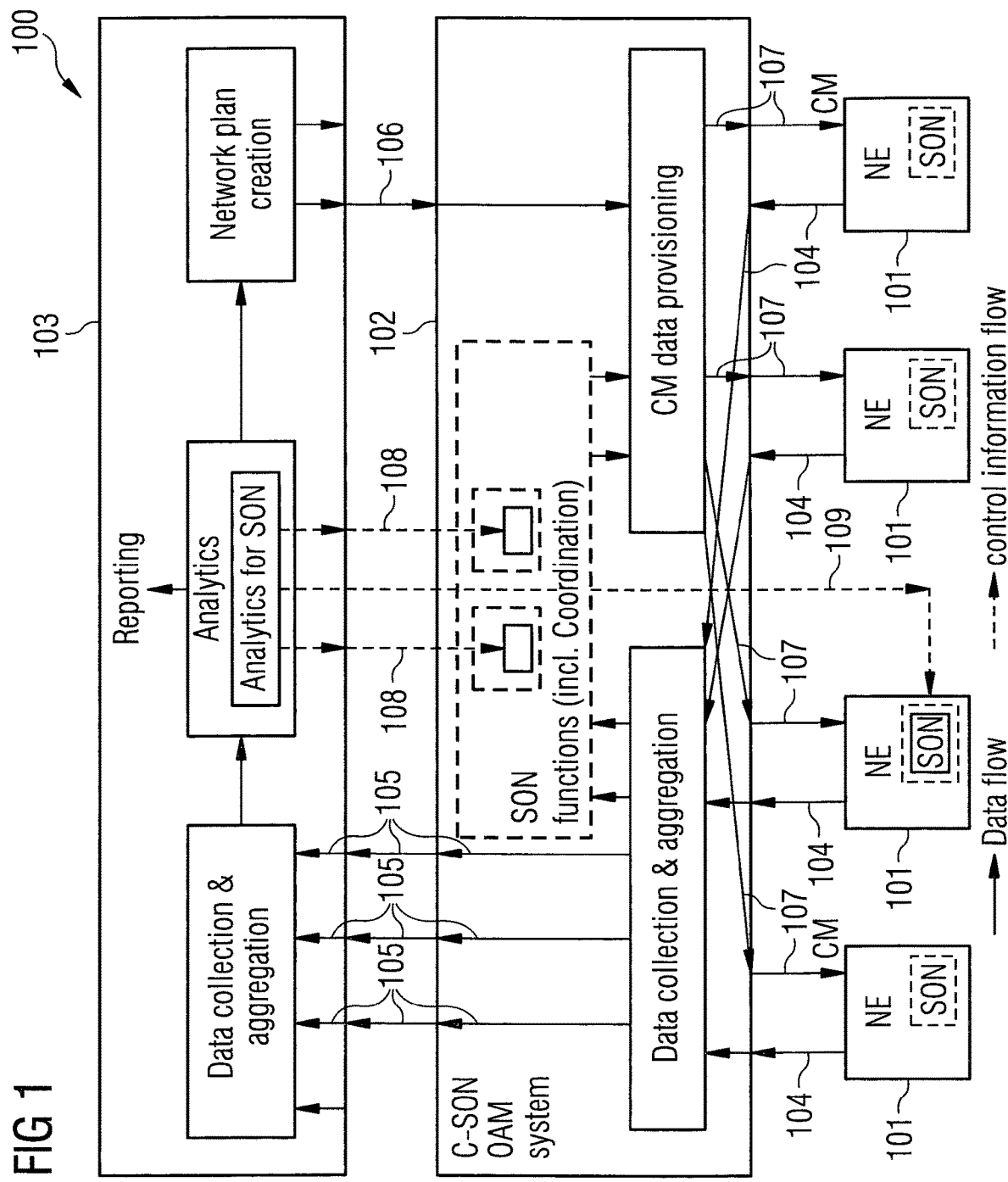
FIG. 1 schematically shows a system architecture with basic building blocks and the respective data and control flows.

The illustration in the drawing is schematic.

FIG. 1 shows a diagram of a considered system architecture and described building blocks and their interactions. In particular, FIG. 1 shows a system architecture of a communication network 100, e.g. a mobile communication network. The communication network 100 comprises a plurality of network elements 101, like, base stations or user equipments, a plurality of operation, administration, maintenance (OAM) systems 102 of which only one is schematically depicted in FIG. 1 for clarity reasons, and at least one big data system 103. Each single network element is adapted to perform some self-organizing network (SON) functions, in particular distributed SON functions (D-SON). Data, comprising Performance Management (PM) data, Fault Management (FM) data (e.g. alarm events), trace data, state data, Configuration Management (CM) data (including events related to configuration changes induced by D-SON functions), and other data, is acquired from the network elements (NE) and is transferred or sent to the OAM system 102 which sending is indicated in FIG. 1 by arrows 104.

The OAM system 102 collects, stores and aggregates this data, e.g. in a raw form. However, the OAM system 102 may also pre-process this data, e.g. to form Key Performance Indicators (KPIs) from raw counters. The OAM system 102 may form a centralized SON (C-SON) level, by performing or defining some centralized SON functions.

The data aggregated from potentially many NE in the OAM system 102 is forwarded to the "big data" system, which forwarding is indicated by the arrows 105 in FIG. 1, where again some collection, aggregation and pre-processing takes place, e.g. aggregating data from several OAM systems. Of course also other OAM systems may forward data to the big data system 103. The data is then processed by an "analytics" entity, which may be formed by a processing entity, e.g. a single or a plurality of computers or servers. The "analytics entity" on one hand outputs reports for human operator consideration but also may drive a further tool-chain (with or without human-in-the-loop) which results in the creation of an updated network plan. Such changes to a whole network domain are then forwarded to the respective OAM system(s), which is indicated by arrow 106, where the actual CM data is provisioned. The provision may be similarly to the provisioning done for smaller manual updates to changes induced by C-SON functions. Finally the updated configuration information is deployed to the NE, which is indicated in FIG. 1 by the arrows 107.

The "analytic" entity does not only provide output which is further used to create new network plans in the big data level, but also provides output directly to the OAM system 102, which is indicated in FIG. 1 by the arrows 108, and/or directly to the network elements 101, which is indicated by the arrow 109. These outputs may form a control information flow and may be used for C-SON functions and/or D-SON functions in the OAM system and the NE, respectively.

With the above described architecture it may be possible to enable a method according to an exemplary embodiment using analytics on "big data" (data mining) generated from a mobile network to Adapt and tune the operation of SON functions (input during operational phase), Generate knowledge to create new SON functions (input for the SON function (re-)design phase).

Thus, it may be possible to efficiently combining the characteristics of "big data" and SON. In particular, the method may be implemented as one of two alternatives (solution A and solution B) or as a combination of the two alternatives.

The first solution may relate to an adaptive profile creation solution or an adaptive profile update solution and may be denoted solution A in the following:

The adaptive profile creation and/or update solution may use the information of certain identified data entities and/or their relations to generate or update a set of "profiles" or "characteristics" describing the behaviour (such as normal behaviour and/or abnormal behaviour including their related action-result associations) of a given SON function. This solution may be realized as a module within the "big data" analytics framework. If such a profile for the SON function needs to be created by the solution, the solution may use the information of the identified data entities and/or their relation to construct an initial profile for the SON function. If such a profile for a SON function already exists, the solution may use the information of the identified data entities and/or their relations to update the already existing profile. The solution works with the assumption that the basic characterization of a set of SON functions is known. The term "Characterization" may refer to a syntactic and semantic description of n SON functions' interfaces (input and/or output parameters and their semantics, target setting interface parameters and their semantics) as well as knowledge about the internal operation of the SON functions. In particular, the knowledge may comprise information about how the profiles of the SON functions are "trained" for operation and their behaviour during operation. A case example to explain this solution is given afterwards.

The second solution may relate to an improving of decision making in the SON system during the operational phase and may be denoted solution B in the following:

The second solution may depend on using adapted profiles by their corresponding SON functions to improve their decision making and other functioning (e.g., their information monitoring) during operational phase. This solution may be realized as a module within each respective SON function which interprets the profile information coming from the aforementioned profile solution. This solution may be able to adjust the SON function's behaviour according to that received information. A case example to explain this solution is given afterwards as well.

The above described two solutions may be used in particular in one of the following cases:

Training for SON functions:
  SON functions which do not implement an own "training" mechanism, may rely on execution of such solution (solution A) at the "big data" analytics level. That means that the SON function gets the adapted/created profile information.
  SON functions which implement an own solution (solution A), can get triggers to retrain from the solution (solution A) in the "big data" system.
Long-term trend identification: long-term trends (e.g., in user behaviour, traffic intensity, etc.) may be identified and SON function target and coordination policy setting may be (automatically) adjusted based on the method (solution A and B together).
Monitoring and/or verification of SON functions (guard function) and/or learning for SON functions may be based on the method (solution A and B together). It should be noted that the big data system may use similar algorithms (but potentially using the significantly increased computing power than available at the SON level) as those contained in the SON functions. However, they may be run at the analytics level (on a potentially larger dataset than available at the SON level, for the same time interval). At the analytics level it may then be possible in retrospective, to correlate the actual configuration changes (outputs) done by the SON functions with the respective input data (and potentially knowledge and/or actual information on the behaviour of the respective SON functions). Based on the correlation, the operation of the individual SON functions may be verified and consequently actions may be taken (like adapting SON functions' targets or inter-function coordination policies, swapping SON functions of the same type, removing SON functions from operation, etc.). If the action directly maps to the ongoing SON operation, some "guard function" may be realized (i.e., if the verification result is negative, the configuration changes by the respective SON function(s) may be rolled back as soon as possible. If the sequence of analysis and actions is automated, a "learning" loop may be realized.

Knowledge generation for (re-)design of (new) SON functions: the latter verification and/or learning functionality may not only be used by a network operator to adapt the currently deployed SON functions, but also be fed back to a network equipment vendor to improve the SW implementing existing SON functions or design new SON functions for use cases which have not been addressed so far. This may constitute basically an automation and/or formalization of today's SON function development process, where real network data is analyzed to design the monitoring and algorithm parts of SON functions.

Figure 2:
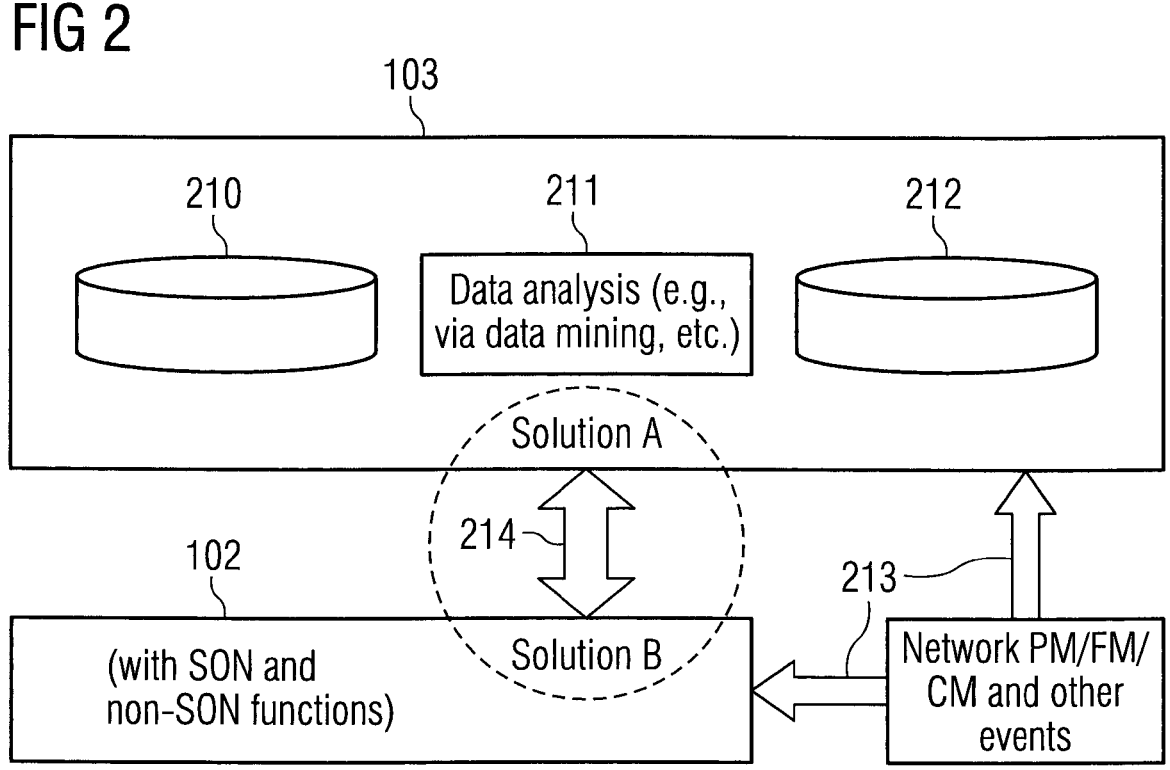
FIG. 2 schematically shows a detail of the overall system of FIG. 1.

FIG. 2 shows schematically a detail of the overall system of FIG. 1. In particular, FIG. 2 shows an interface between the big data system 103 and the operation, administration and maintenance system 102 forming a self-organizing network system (SON System). In particular the big data system 103 comprises a first storage portion 210 adapted to collect and store the information data forwarded from the OAM system 102 to the big data system (corresponding to arrows 105 of FIG. 1), and an analytics level 211, e.g. formed by a processing unit, adapted to perform data analysis, e.g. via data mining, based on the information data stored in the first storage portion 210. The results of the analysis is then transmitted either to a second storage portion 212 of the big data system 103 or directly send or transferred to the SON system 102 for further processing. In particular, the above described solution A may be performed in the big data level, e.g. in the analytics level 211, while the above described solution B may be performed in the SON system 102 on the transferred results or pre-processed data received from the big data system 103. It should be noted that the SON system may of course not only comprise or implement SON functions but also non-SON functions. Additionally, data concerning Performance Management (PM), Fault Management (FM) (e.g. alarm events), and Configuration Management (CM) may be exchanged between the big data system 103 and the SON system 102 which is indicated in FIG. 2 by the arrows 213. A basic idea of the embodiment shown in FIG. 2 is to provide an interface between the big data system 103 and the SON system 102 which is used to exchange data or information between SON functions or an entity creating/changing/updating such SON functions in the SON system and the analytics level of the big data system. This interface is schematically indicated by arrow 214 in FIG. 2.

Figure 3:
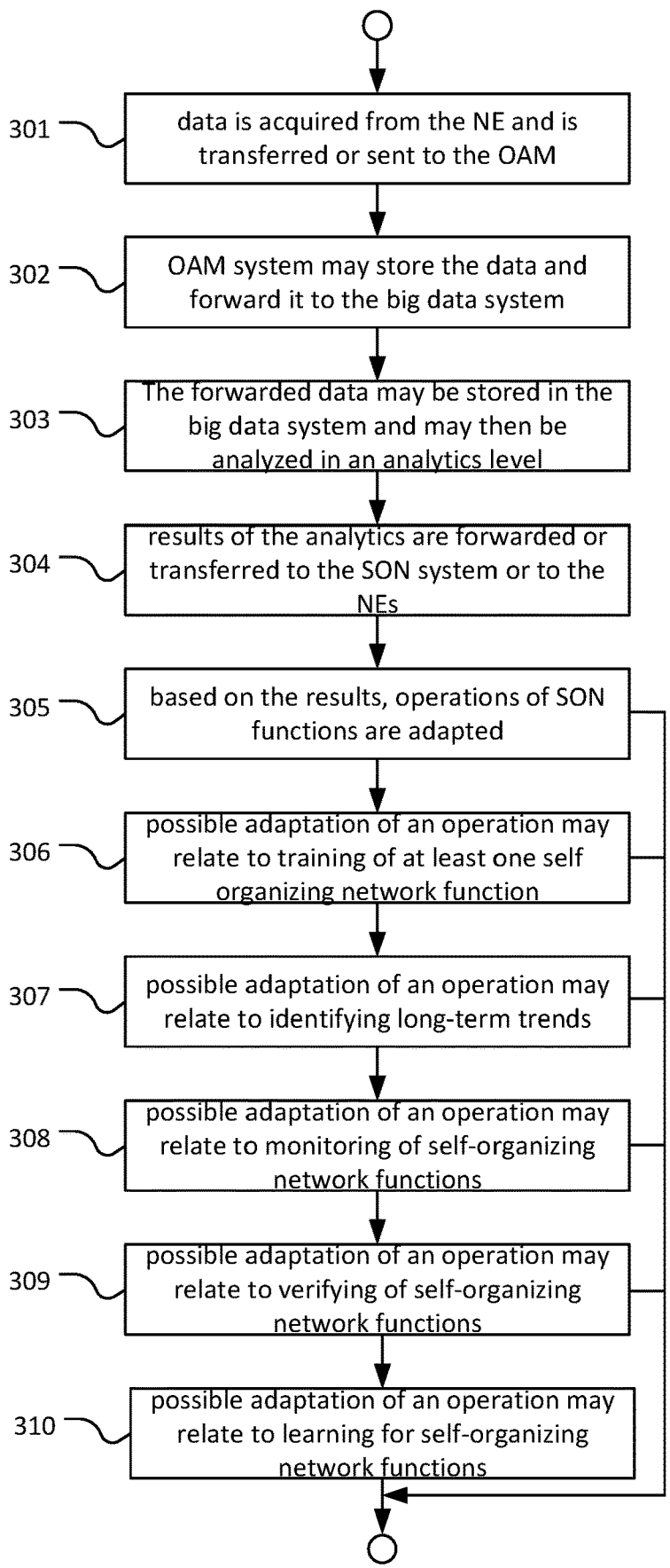
FIG. 3 schematically shows a general flow chart of a method according to an exemplary embodiment.

FIG. 3 schematically shows a general flow chart of a method according to an exemplary embodiment. In particular, the method comprises at least one of the following steps:

In a first step data, comprising PM data, FM data, CM data, trace data, and/or state data, is acquired from the NE and is transferred or sent to the OAM (step 301).

Afterwards the OAM system may store these data and forwards the same in original or already pre-processed way to the big data system (step 302).

Then the forwarded data may be stored in the big data system and may then be analyzed in an analytics level (step 303).

Furthermore, results of the analysis are forwarded or transferred to the SON system or to the NEs (step 304).

Based on these results operation of SON functions are adapted in a further step, which may be performed in the big data system, the SON system, and/or in the NEs itself (step 305). Possible adaptations of the operation may relate to the training at least one self-organizing network function based on the adapting the operation of at least one self-organizing network function (step 306); the identifying long-term trends (step 307); the monitoring of self-organizing network functions (step 308); the verifying of self-organizing network functions (step 309); and/or the learning for self-organizing network functions (step 310).

It should further be noted that a basic gist of the methods according to exemplary embodiments relates to the specific interfacing of the big data system or big data level and the SON system or SON level, in particular in that specific analytics are performed in the big data level with similar algorithms as they are typically used in the SON level, but by using the greater processing power of the big data system and/or the availability of a greater amount of data with respect to the pure amount of data as well as with respect to different types or classes of data which are typically not available in the SON level.

In the following some concrete or specific application examples according to an exemplary embodiment are given. For example one application may relate to cell anomaly detection, which is a functional part of the SON self-healing area. According to an exemplary embodiment the following improvements for cell anomaly detection may be provided:

Profile generation (of solution A): in a training phase, a set of "profiles" describing "normal" behaviour may be generated. Obviously the profiles are dependent on context like time-of-day, weekday vs. weekend and/or bank holiday. Profile generation at the SON level can be replaced or complemented information derived from "big data" analytics. In particular, the triggering may retrain at the SON level at specific points in time.

Learning of detection parameters (of solution A): in a training phase, certain parameters governing the detection process may be learned. Such a training phase can potentially be executed faster with less human supervision at the "big data" level.

Sensitivity adjustment: as the operator's network assets are fixed for a certain time interval but traffic is growing constantly, the sensitivity setting for the anomaly detection must be adjusted over time. That means that the fuzzy area between normal and abnormal shifts over time (i.e., the tolerable level of network degradations increases for an operator over time) (of solution A)

Evaluation of detection results (of solution A): to evaluate detection results (in operation), it may be required to correlate other data (CM and/or FM data, ideally also human knowledge about incidents) with the detection results and thus compute performance metrics (like detection and false positive rate). This is clearly going beyond the data which is required purely to drive the detection process. Also, more sophisticated detection methods (e.g., a combination of a number of different methods which is not feasible to be executed in an "online" way for computational complexity reasons) could be run on the "big data" level to allow for higher quality detection results, contributing to the verification of the SON-level mechanism. Hence it would be advantageous to execute such an automated evaluation at the "big data" level SON self-healing function use solution B to get the updated profile (possibly including the specific values of any relevant parameters of the function) and reconfigure itself for the improved operation (e.g., improved fault detection accuracy, newly identified fault cases added for the detection, etc).

Another example application for which a method according to an exemplary embodiment may be used is antenna tilt optimization, which may include the following steps:

Knowledge acquisition (of solution A): in a training phase, knowledge on different deployment scenarios (like rural, urban, etc.) and within those scenarios, specific deployment characteristics (cell sizes) may be acquired.

This may replace or complement the knowledge acquisition done within the respective SON function.

Learning of tilt parameters (of solution A): in a training phase, initial and operational setting for antenna tilt may be learned. Such a training phase may potentially be executed faster with less human supervision at the "big data" level.

Evaluation of tilt optimization results (of solution A): to evaluate the efficiency of tilt optimization, it may advantageous to analyze a lot of data from deployments with similar characteristics (cf. knowledge acquisition above). This means that from a huge amount of data, such deployments need to be found and some performance comparison (also given CM history) needs to be executed.

Tilt optimization functions use solution B to get the additionally acquired knowledge and/or learned parameters and reconfigure themselves for the improved operation.

It should be noted, that network devices or network elements and their functions described herein may be implemented by software, e.g. by the computer program product for a computer, or by hardware. For executing their respective functions, correspondingly used entities, such as an interworking node or network control element may comprise several means and components (not shown) which may be used for control, processing and communication functionality and/or signalling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

LIST OF REFERENCE SIGNS

100 Communication network
101 Network elements
102 Operation, administration and maintenance system
103 Big data system
104 Data sent to the OAM system
105 Data sent to the big data system
106 Network plan sent to OAM system
107 Updated configuration information to NE
108 Output to the OAM system
109 Output to the NEs
210 First storage unit
211 Analytics module
212 Second storage unit
213 PM/FM/CM data exchange
214 Interface between big data system and SON system
301 Transferring data to OAM system
302 Forwarding data to the big data system
303 Analysing the forwarded data
304 Forwarding results of the analysis
305 Adaptation of operation
306 Training SON function
307 Identifying long-term trends
308 Monitoring SON functions
309 Verifying SON functions
310 Learning of SON functions

The invention claimed is:

1. A processor executed method of tuning operation of at least one self-organizing network function in a communication network comprising a big data system and a self-organizing network system, the method comprising:
collecting, at the processor, data from network elements;
tuning the operation of the at least one self-organizing network function by using knowledge achieved by an analysis performed by the big data system on the collected data,
wherein the big data system comprises data of a network domain of the at least one self-organizing network function and data of another network domain of another self-organizing network function; and
verifying operation of the at least one self-organizing network function, wherein the verifying further comprises checking whether a change to the at least one self-organizing network function leads to an intended change in operation of the at least one self-organizing network function.

2. The method according to claim 1, wherein the creation or updating is based on information of certain identified data entities or their relations.

3. The method according to claim 1, wherein the at least one updated profile is used by a corresponding self-organizing network function.

4. The method according to claim 1, further comprising training the at least one self-organizing network function based on the tuning of the operation of at least one self-organizing network function.

5. The method according to claim 1, further comprising:
performing the analysis at an analytics module of the big data system.

6. The method according to claim 5, further comprising transferring a result of the analysis to the self-organizing network system.

7. The method according to claim 1, wherein the big data system includes minimization of drive tests (MDT).

8. The method according to claim 1, wherein the data in the big data system includes location based data from a plurality of user equipment.

9. The method according to claim 1, wherein the data in the big data system includes data from at least one of macro, micro, pico and femto cell layers of a radio access technology (RAT).

10. The method according to claim 1, further comprising training the at least one self-organizing network function based at least on the data of the network domain of the at least one self-organizing network function, and the data of the another network domain of another self-organizing network function.

11. The method according to claim 1, further comprising training the at least one self-organizing network function based at least on the data of a cell of the at least one self-organizing network function, and another data of another cell of another self-organizing network function.

12. The method according to claim 1, further comprising training the at least one self-organizing network function based at least on the data of another self-organizing network function with deployment similar to the at least one self-organizing network function.

13. The method according to claim 1, wherein the verifying further comprises accessing aggregate behaviour of the at least one self-organizing network function after least one instance of the at least one self-organizing network function has been executed.

14. The method according to claim 1, further comprising rolling back the change to the at least one self-organizing network function.

15. The method according to claim 1, wherein the tuning of the operation is performed by updating or creating at least one profile of a set of profiles.

16. A big data system for a communication network comprising a self-organizing network system, wherein the big data system comprises:
an analytics module configured to perform an analysis on data collected by network elements and to provide results of the analysis to at least one self-organizing network function, wherein an operation of the at least one self-organizing network function is verified by checking whether a change to the at least one self-organizing network function leads to an intended change in operation of the at least one self-organizing network function; and
data of a network domain of the at least one self-organizing network function and data of another network domain of another self-organizing network function.

17. A self-organizing network system for a communication network, the self-organizing network system comprising at least one self-organizing function,
wherein the self-organizing network system is configured to receive analysis results of an analytics module of a big data system,
wherein the big data system is configured to perform an analysis of data collected by network elements, and
wherein the big data system comprises data of a network domain of the at least one self-organizing network function and data of another network domain of another self-organizing network function,
wherein the self-organizing network system is configured to tune an operation of at least one of the self-organizing functions by checking whether a change to the at least one of the self-organizing network functions leads to an intended change in operation of the at least one of the self-organizing network functions.

18. The self-organizing network system according to claim 17, wherein the self-organizing network system is further configured to tune the operation of the at least one of the self-organizing functions based on the received analysis results.

\* \* \* \* \*